(12) United States Patent
Girondi

(10) Patent No.: US 9,504,943 B2
(45) Date of Patent: Nov. 29, 2016

(54) FILTER GROUP WITH PRESENCE SENSOR OF WATER IN DIESEL FUEL

(71) Applicant: UFI FILTERS S.P.A., Porto Mantovano (IT)

(72) Inventor: Giorgio Girondi, Mantova (IT)

(73) Assignee: UFI FILTERS S.P.A., Porto Mantovano (MN) (IT)

( * ) Notice: Subject to any disclaimer, the term of this patent is extended or adjusted under 35 U.S.C. 154(b) by 0 days.

(21) Appl. No.: 15/022,764

(22) PCT Filed: Sep. 16, 2014

(86) PCT No.: PCT/IB2014/001877
§ 371 (c)(1),
(2) Date: Mar. 17, 2016

(87) PCT Pub. No.: WO2015/040479
PCT Pub. Date: Mar. 26, 2015

(65) Prior Publication Data
US 2016/0236123 A1 Aug. 18, 2016

(30) Foreign Application Priority Data
Sep. 19, 2013 (IT) .............................. RE2013A0066

(51) Int. Cl.
*B01D 36/00* (2006.01)
*B01D 35/00* (2006.01)
*B01D 29/13* (2006.01)
*B01D 35/18* (2006.01)

(52) U.S. Cl.
CPC ............ *B01D 36/005* (2013.01); *B01D 29/13* (2013.01); *B01D 35/005* (2013.01); *B01D 35/18* (2013.01); *B01D 36/006* (2013.01); *B01D 2201/291* (2013.01)

(58) Field of Classification Search
None
See application file for complete search history.

(56) References Cited

U.S. PATENT DOCUMENTS 9,279,780 B2 * 3/2016 Gwin ................... B01D 36/005
2002/0144938 A1 10/2002 Hawkins et al.

FOREIGN PATENT DOCUMENTS

WO 2004009215 A1 1/2004
WO 2013120568 A1 8/2013

* cited by examiner

*Primary Examiner* — Terry Cecil
(74) *Attorney, Agent, or Firm* — Volpe and Koenig, P.C.

(57) ABSTRACT

A filter cartridge (40) for filtering a fluid comprising a tubular filter wall (43) and at least an annular support plate (42) fixed to a lower end of the filter wall (43) and made of at least an electrically-insulated material, comprising at least a conductive strip (50) made of an electrically conductive material, partially sunk in the support plate (42) and provided with at least a portion (51, 52) exposed therefrom.

12 Claims, 6 Drawing Sheets

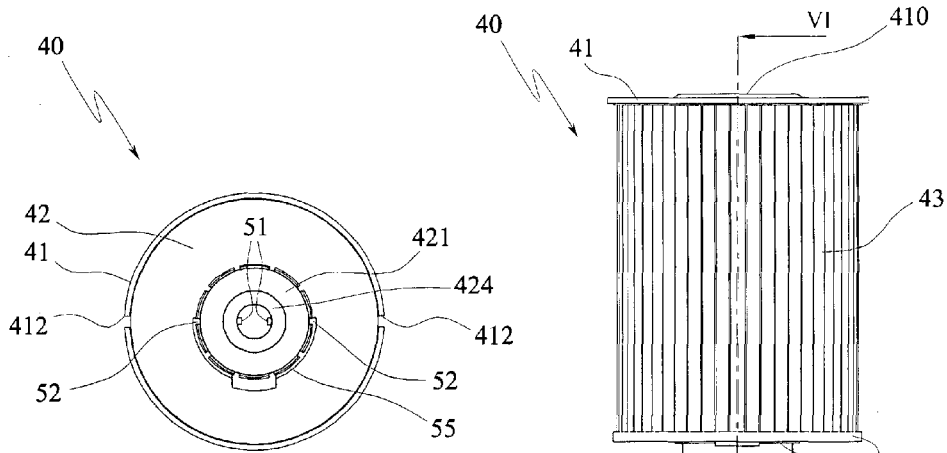
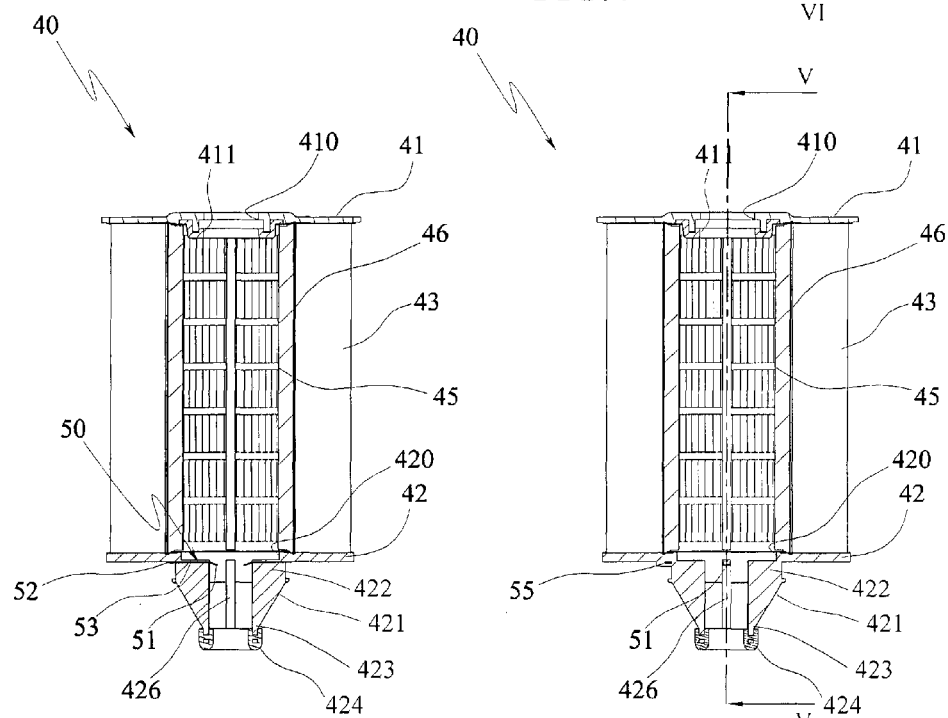
FIG.3
FIG.4
FIG.5
FIG.6

FILTER GROUP WITH PRESENCE SENSOR OF WATER IN DIESEL FUEL

TECHNICAL FIELD

The present invention relates to a filter group and the relative filter cartridge for filtration of diesel fuel in the automotive field.

In greater detail, the invention relates to a filter group provided with a sensor of the presence of water in diesel fuel and the relative filter cartridge.

PRIOR ART

As is known, the filtering of the diesel fuel in the automotive field is generally obtained with a filter group comprising an external casing provided with a substantially beaker-shaped body, the open end of which is closed by a cover.

At least one from between the cover and the beaker body is provided with an inlet for the diesel to be filtered and an outlet of the filtered diesel. At least a filter cartridge is contained internally of the casing, which filter cartridge is for sub-dividing the internal volume of the casing into two distinct chambers, of which a first chamber communicating with the inlet and a second chamber communicating with the outlet. In this way, the diesel flowing from the inlet towards the outlet of the filter group is forced to cross the filter cartridge, which retains the impurities that might be present therein.

A certain quantity of water is also present in the diesel, which due to the greater specific weight thereof with respect to the specific weight of the fuel to be treated (for example diesel oil) tends to accumulate on the bottom of the beaker body and must therefore be eliminated during the functioning of the filter group.

In the prior art, for facilitating the separation of the water from the fuel, filter walls are generally used which are able to separate the water by coalescence from the fuel and/or hydrophobic nets which keep the water separated from the fuel, so that the water collects by force of gravity on the bottom of the casing.

Further, also known is the use of discharge conduits associated to the casing of the filter group which place the lower part of the casing, where the water tends to collect, in communication with discharge means and/or aspirating means of the water, so that the accumulated water is constantly emptied from the casing.

To detect the presence of accumulated water in the casing, with the aim of preventing the level of water from exceeding a predetermined maximum level and so that it can therefore be accessed and sent into the combustion chamber, there are sensors present (known as water in fuel sensors) which are associated to the casing in such a way that a sensitive part of the sensor is located in proximity of the bottom thereof.

The sensors detecting the presence of water are operatively connected to the electronic board of the vehicle and are configured so as to generate an alarm signal in a case where the water reaches the maximum level, which generally corresponds to the level at which the sensitive part of the sensor is located internally of the casing.

When the alarm signal is generated it is sufficient to empty the water present on the bottom of the casing via the discharge conduit.

The water presence sensors in practice comprise an electric circuit that terminates with one or more uncovered electrodes, which are the sensitive part of the sensor and are destined to be arranged internally of the casing and immersed in the fluid being filtered.

The level the water has reached in the casing is calculated from the measurement of the conductivity of the liquid about the electrodes, which is different if the electrodes are immersed in the diesel or in water.

There exist water presence sensors the electrodes of which are fixed to the bottom of the casing or which are fixed to the lower end of the longitudinal stem which branches from the upper cover of the casing.

A drawback encountered in the filter groups of known type, in which the water presence sensor is integrated in the casing, is the fact that a non-original filter cartridge or a cartridge arranged wrongly internally of the casing might obscure the sensor or render it inefficient.

Further, the water presence sensors of known type are either only in the chamber of the casing positioned upstream of the filter wall containing the diesel to be filtered or in only the chamber of the casing positioned downstream of the filter wall containing the filtered diesel.

Lastly, a drawback encountered in known filter groups relates to the fact that the water level sensor is located at a height independently of the filter cartridge, and might therefore be located at a greater height with respect to the level of the lower support plate of the filter cartridge and therefore at a level corresponding to a sector of the filter wall.

An aim of the present invention is to obviate the above-mentioned drawbacks in the prior art, with a solution that is simple, rational and relatively inexpensive.

The above aims are attained by the characteristics of the invention reported in the independent claim. The dependent claims delineate preferred and/or particularly advantageous aspects of the invention.

DESCRIPTION OF THE INVENTION

In particular the invention discloses a filter cartridge for filtering a fluid comprising a filter wall having a tubular shape and at least an annular support plate fixed to a lower end of the filter wall and made of at least an electrically-insulating material.

In the invention, the filter cartridge comprises at least a conductive strip made of an electrically conductive material, partially sunk in the support plate and provided with at least a portion exposed therefrom.

For example, the exposed portion is destined to come into contact with an exposed electrical contact sunk in the fluid being filtered of a water level sensor.

With this solution the position of the water level sensor internally of the filter group can be freed from the maximum level permitted of the water accumulating on the bottom of the casing.

Further, thanks to this solution the conductive strip can be configured in such a way that it prolongs the level sensor of the water immersed in the fluid being filtered, so that the exposed portion of the conductive strip, which is for certain located at a lower level with respect to all the filter wall, is able to detect when a level of the water in the casing of the filter group has reached a level that is surely lower than the whole filter wall, preventing direct contact between the water and the filter wall.

Further, in an advantageous aspect of the invention, the filter cartridge comprises at least a pair of conductive strips, for example separated from one another.

In a first embodiment of the invention, the conductive strips of the pair of conductive strips are advantageously electrically insulated from one another.

With this solution, the conductive strips are destined to be a simple prolongation internally of the casing of the exposed electrical contacts of the water level sensor.

Alternatively, the conductive strips of the pair of conductive strips can be electrically connected to one another by means of at least a resistor at least partially sunk into the support plate.

With this solution, the structure of the water level sensor can be simplified, making a diagnostic check thereof possible by means of the electrical resistance offered by the resistor integrated in the filter cartridge.

Further, thanks to the solution using the water level sensor it is possible to determine the presence of the correct filter cartridge (i.e. the filter cartridge originally intended for the filter group), as well as the correct positioning thereof, in the filter group, for example, making use of non-original replacement items more difficult.

In both above-described variants, in a further advantageous aspect of the invention each conductive strip can comprise at least two exposed portions, of which at least a first exposed portion (destined to come into contact with an exposed electrical contact immersed in the fluid being filtered of the water level sensor) and at least a second exposed portion (distal from the first exposed portion), wherein the first exposed portion is located at a distance from the axis of the support plate that is smaller with respect to the distance from the axis of the support plate of the second exposed portion, at least a tract of the intermediate conductive strip between the first and the second exposed portion being (totally) sunk into the support plate.

In this way, two zones can be defined, for example two separate chambers of the casing, in which the conductive strip enters into contact (by means of the respective exposed portions) with the fluid being filtered, with the aim of being able to determine a reaching of the critical level of the water in the casing, independently in one or the other zone.

In a further aspect of the invention the conductive strip can exhibit at least a tract, for example the intermediate tract between the exposed portions, if the exposed portions are two or more, with a longitudinal axis substantially arranged in a radial direction sunk into the support plate.

In a second embodiment of the filter cartridge, each conductive strip can comprise at least two exposed portions, of which a first exposed portion and a second exposed portion.

The first exposed portion is, for example, located at a greater axial height than the second exposed portion, and at least a portion of the conductive strip, intermediate between the first and the second exposed portion, is sunk in the support plate.

With this solution, each conductive strip defines an axial prolongation of an electrical contact.

The first exposed portion can advantageously be located at a higher level than the lower support plate, i.e. radially aligned with at least a portion (lower) of the filter wall, and the second exposed portion is located at a lower level than or a same level as a lower axis end of the lower support plate.

Further, at least the portion (intermediate) with the longitudinal axis of the conductive strip can substantially be arranged in an axial direction and be sunk in the support plate.

In a still further aspect of the invention, the support plate comprises at least a hollow shank coaxial with the filter wall and communicating with the internal volume of the filter wall by means of a central hole of the annular support plate, a first exposed portion of the conductive strip being located internally of the hollow shank and a second exposed portion being located externally of the hollow shank.

For example, the filter cartridge comprises an annular seal associated to the hollow shank.

Thanks to this solution the presence of water can be detected in two separate environments (and communicating only through the filter wall) of the casing in which the filter cartridge is located, one internally of the filter wall and the other external thereof, for example one containing filtered diesel and the other containing diesel to be filtered.

A further aspect of the invention relates to a filter group comprising an external casing provided with at least an inlet of the fluid to be filtered, at least an outlet of the filtered fluid and a filter cartridge, as described above, contained internally of the casing, such that the filter wall is crossed by the fluid flowing from the inlet towards the outlet and the support plate of the filter cartridge is the lower plate proximal to the bottom of the casing, at least an electrical contact of a water sensor in the diesel being arranged in proximity of the bottom of the casing and associated thereto.

In the invention, the at least an exposed portion of the conductive strip is able to come into contact with the at least an electrical contact, when the filter cartridge is contained internally of the casing so as to prolong (for example axially and/or radially) the electrical contact internally of the external casing. With this configuration of the filter cartridge and the filter group, the above-detailed advantages can be attained.

BRIEF DESCRIPTION OF THE DRAWINGS

Further characteristics and advantages of the invention will emerge from a reading of the following description provided by way of non-limiting example, with the aid of the figures illustrated in the appended tables.

FIG. 3 is a view from below of a filter cartridge according to the invention.

FIG. 4 is a front view of FIG. 3.

FIG. 5 is the section view along section line V-V of FIG. 6.

FIG. 6 is the section view along section line VI-VI of FIG. 4.

BEST WAY OF CARRYING OUT THE INVENTION

Figure 1:
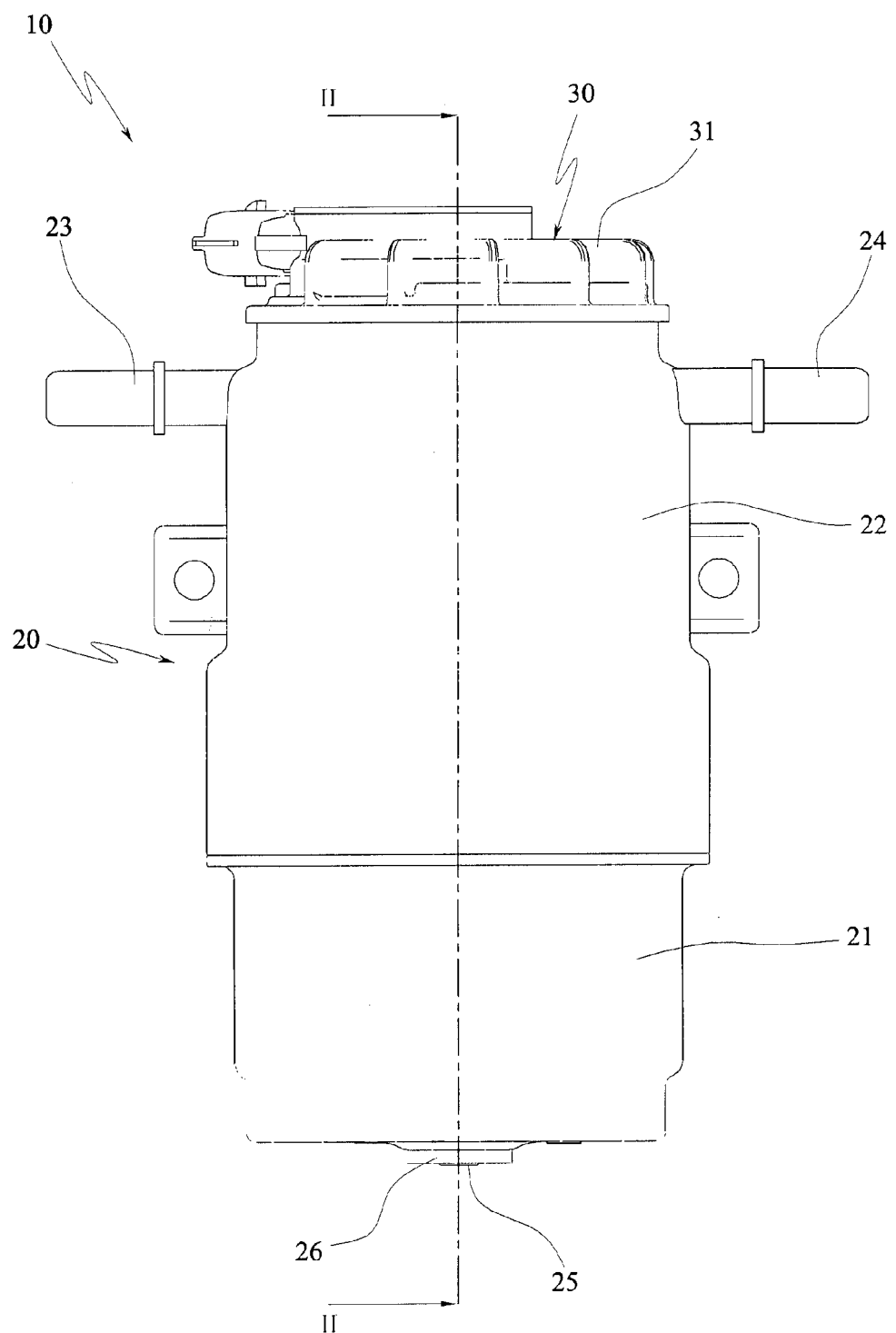
FIG. 1 is a front view of a filter group according to the invention.

In the figures, reference numeral 10 denotes in its entirety a filter assembly for filtration of diesel fuel in a diesel engine of a motor vehicle. The filter assembly 10 comprises an outer casing, generally denoted by 20, which includes, for example, a beaker-shaped body 21, and a cover 22 suitable for closing the beaker-shaped body 21.

The cover 22 comprises an inlet conduit 23 for the diesel to be filtered and an outlet conduit 24 for the filtered diesel.

The beaker-shaped body 21 comprises, for example positioned at the bottom thereof, a discharge conduit 25 for the water that accumulates on the bottom of the beaker-shaped body 21, provided with a connecting cap 26 which will be better described in the following.

Figure 2:
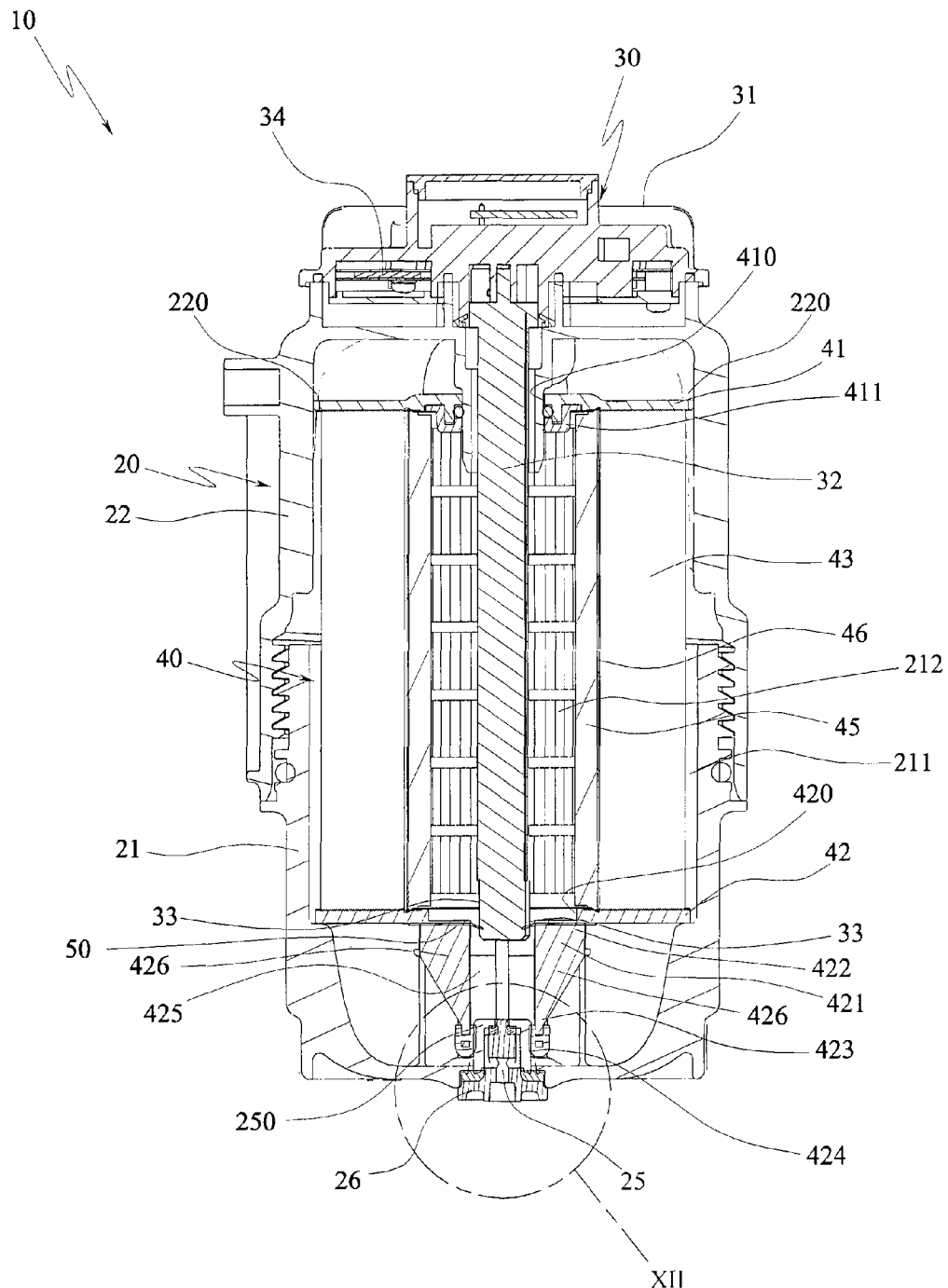
FIG. 2 is a section view along section line II-II of FIG. 1.
Figures 7, 8:
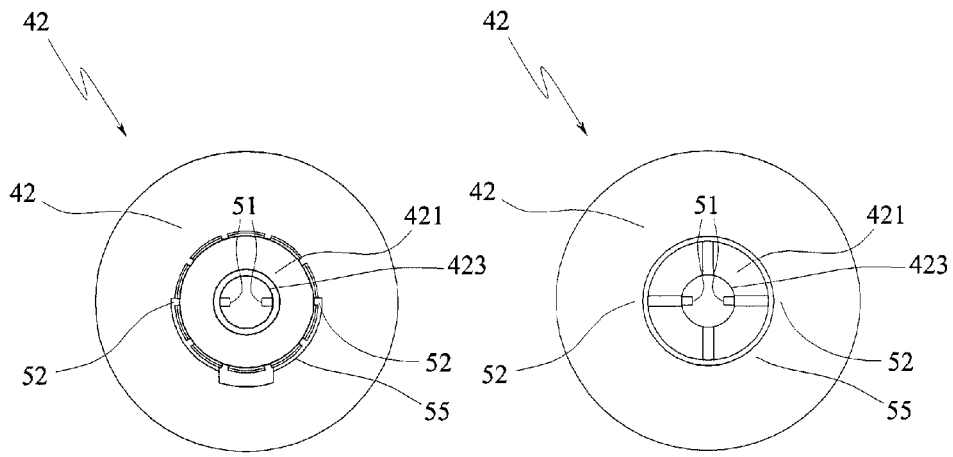
FIG. 7 is a view from below of a lower support plate of the filter cartridge of FIG. 3.
FIG. 8 is a view from above of FIG. 7.
Figure 9:
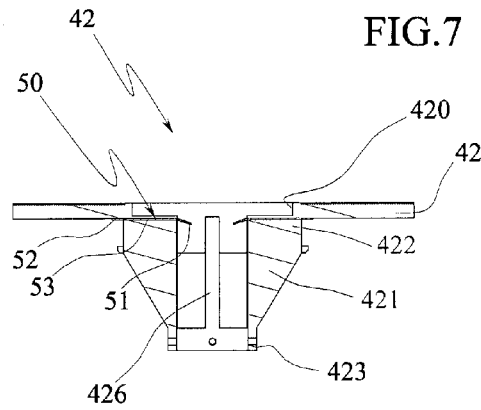
FIG. 9 is a section view along section line IX-IX of FIG. 10.
Figure 10:
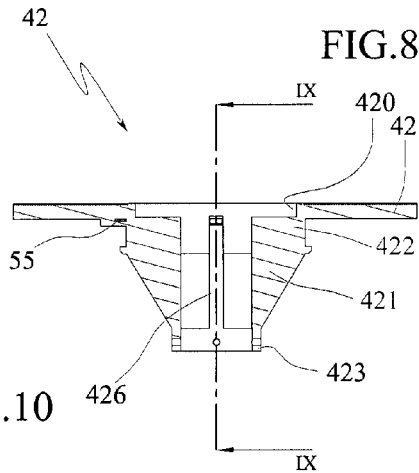
FIG. 10 is a section view along section line X-X of FIG. 11.
Figure 11:
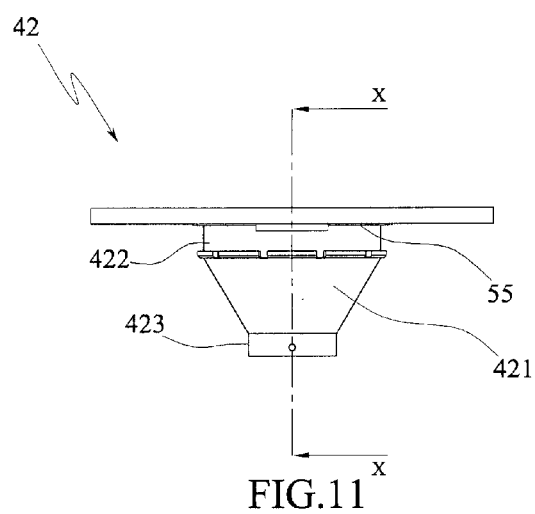
FIG. 11 is a front view of FIG. 7.
Figure 12:
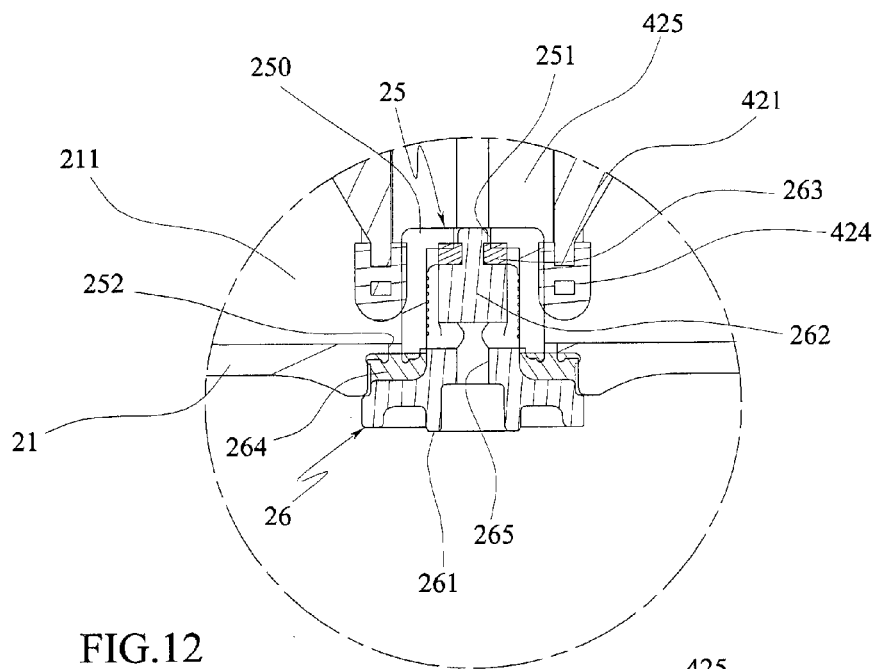
FIG. 12 is detail XII of FIG. 2, with the water discharge conduit in a closed configuration.
Figure 13:
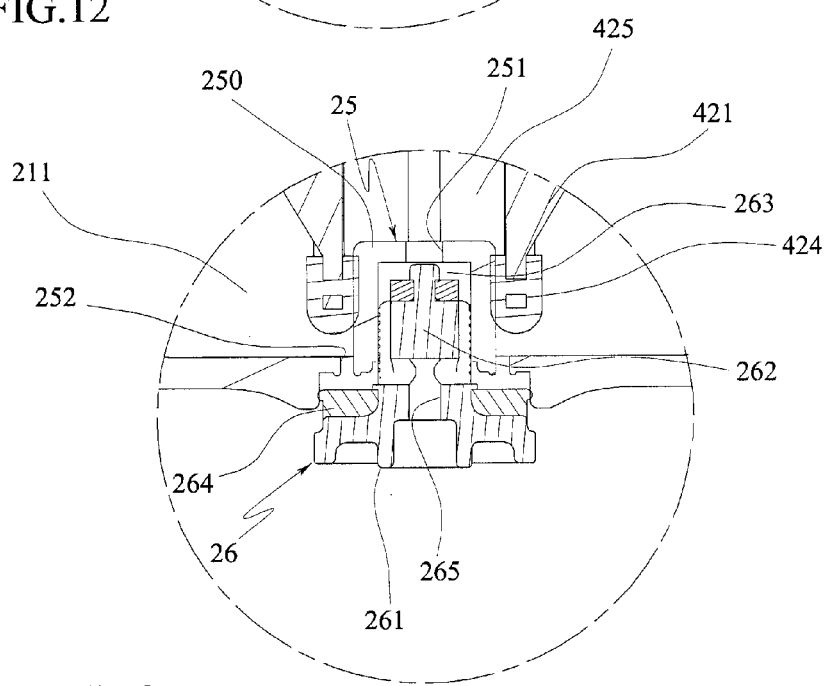
FIG. 13 is a detail of FIG. 2 with the water discharge conduit in an open configuration.

In the illustrated example (see FIG. 2 and FIGS. 12 and 13), the discharge conduit 25 has a substantially cylindrical internal portion 250, coaxial with the beaker-shaped body 21 and rising from the bottom of the beaker-shaped body 21 for a limited axial portion.

The internal portion 250 is internally hollow and is substantially beaker-shaped with the concavity thereof facing on the opposite side with respect to the beaker-shaped body 21.

The internal portion 250 exhibits for example an internal thread for the screwing-in of the connecting cap 26.

The internal portion 250 comprises, at the top wall thereof (the bottom of the beaker-shaped body), a first through-hole 251, which—normally occluded by the connecting cap 26—enables discharge of the water contained in the casing 20, as will become apparent in the following, when it is released from the connecting cap 26.

Alternatively, a discharge conduit can be also provided on the cover 22 and be connected to a cannula drawing from the bottom of the beaker-shaped body 21.

The filter assembly 10 includes a water level sensor 30, which for example comprises a plate-shaped head 31 (for example, disc-shaped) from which a stem inferiorly extends 32, which stem internally supports an electronic circuit and which bears at a lower end thereof at least an exposed electrical contact 33.

The example shows two electrical contacts 33 which, for example, are located diametrically opposite.

One only electrical contact 33 might be provided, or more than two electrical contacts 33, depending on the operation of the electronic circuit.

Each electrical contact 33 is made from a conductive metal plate that can be housed in a flattening made in the stem 32.

The water level sensor 30 is configured to detect the level of water that accumulates on the bottom of the beaker-shaped body 21 during filtration of diesel fuel and is associated, as known to a technical expert of the sector, to an electronic control unit (not shown) of the vehicle.

In the illustrated example the water level sensor 30 is fixed to the cover 22, for example so that the plate-shaped head 31 is arranged externally of the casing 20 and the rod 32 projects inside the casing itself, for example through a special hole made in the cover 22.

In practice, the stem 32 can be substantially coaxial with the casing 20.

Further, each electrical contact 33 can be arranged in the housing 20 near the bottom of the beaker-shaped body 21 and at a distance therefrom.

A heater element 34 (such as an electric heater) can be housed, for example, inside the plate-shaped head 31, suitable for heating the diesel contained in the casing 20, for example during the first moments of engine operation.

However, the water level sensor might alternatively branch from the bottom of the beaker-shaped body 21.

A filter cartridge, denoted in its entirety by 40, is accommodated internally of the casing 20; the filter cartridge 40 includes for example an upper support plate 41 and a lower support 42 plate, which are fixed to opposite ends of a tubular filter wall 43, in the illustrated example a pleated wall, which defines and delimits a substantially cylindrical internal volume.

The filter wall 43, alternatively, could be a depth wall.

The upper support plate 41 is substantially disc-shaped and has a central hole 410 centred on the longitudinal axis A of the filter wall 43.

The lower support plate 42 is also substantially disc-shaped and has a central hole 420 centred on the longitudinal axis A of the filter wall 43.

The lower support plate 42 is in particular made of at least an electrically insulating material, such as a plastic material.

The central holes 410 and 420 of the upper support plate 41 and the lower support plate 42 are threaded on the portion projecting internally of the beaker-shaped body 21 of the stem 32.

In particular, the central hole 410 of the upper support plate 41 inserts on an terminal internal portion of the outlet conduit 24, which is able to accommodate the upper portion of the stem 32 with radial play.

A seal ring 411 is interposed between the internal end portion of the outlet conduit 24 and the internal edge of the central hole 410 of the upper support plate 31, which seal ring 411 is fixed to the internal edge of the central hole 410, such that the internal volume of the filter cartridge 40 communicates exclusively with the outlet conduit 24.

Furthermore, the free end of the stem 32 protrudes below the upper support plate 41 and terminates internally of the internal volume of the filter wall 43.

The lower end of the rod 32 enters, with radial play, in the central hole 420 of the lower support plate 420 and terminates substantially at the same level (slightly lower) as the lower support plate.

Further, the filter cartridge 40 includes a hollow support core 45 arranged coaxially and internally of the filter wall 43, which core 45 affords radial openings and is fixed at opposite ends thereof respectively to the upper support plate 41 and the lower support plate 42.

With the above-described configuration, the filter cartridge 40 sub-divides the internal volume of the casing 20 into a first chamber 211, defined externally of the filter wall 43 and internally of the casing 20, which communicates with the inlet conduit 23 of the diesel to be filtered, and into a second chamber 212, coinciding with the internal volume of the filter wall 43, which communicates with the outlet conduit 24 of the filtered diesel.

The filter cartridge 40 further comprises a hydrophobic net 46, for example also of tubular shape, coaxially inserted in the filter wall 43 so as to intercept the flow of fuel through the filter wall itself.

Alternatively or in addition, the filter wall 43 is of a coalescent type in order to improve the separation of water from the diesel fuel.

The filter assembly 10 comprises orientation means of the filter cartridge 40, suitable for orientating the filter cartridge 40 within the housing 20.

The orientation means comprise at least a pair of positioning grooves 412, afforded in at least one of the upper support plate 41 and the lower support plate 42, in the example the upper support plate 41, at an external edge thereof and placed in a predetermined reciprocal angular position, in the example diametrically opposite.

The orientation means further comprise a pair of ribs 220, fashioned internally of at least one between the cover 22 and the beaker-shaped body 21, in the example the cover 22, which, being placed at the same reciprocal angular position of the pair of positioning grooves 412, are configured to engage the pair of positioning grooves 412, when the filter cartridge 40 is correctly arranged in the casing 20.

In practice, the filter cartridge 40 can be arranged in only a few possible orientations (two in the example) inside the housing 20.

The lower support plate 42 comprises a hollow shank 421 coaxial with the filter wall 43 and arranged on the opposite side of it.

The hollow shank 421 is able to axially extend the internal volume of the filter wall 43 by a limited axial length.

The hollow shank 421, for example, is substantially truncoconical with an upper end 422 (the broad end) branching downwards from the lower support plate 42 and with the lower end 423 (the tapered end) free.

The hollow shank 42 can also exhibit a different shape, for example substantially cylindrical.

The lower end 423 of the hollow shank 421 comprises an annular seal 424 able to surround (frontally, internally and/or externally) the edge of the second end.

The hollow shank 421 is able to insert substantially snugly and sealedly (by means of the annular seal 424) on the internal portion 250 of the discharge conduit 25.

Further, the bottom of the beaker-shaped body 21 and the hollow shank 421 comprise coupling means, such as elastic teeth and respective seatings, able to define a mutual coupling, for example of the snap type, bayonet type or a combination of the two.

In practice, the hollow shank 421 (with the top wall of the internal portion 250) defines a collecting volume 425 of the water communicating with the internal volume of the filter wall 43 via the central hole 420 of the lower support plate 42.

The second chamber 212 (of the filtered diesel) is defined by the internal volume of the filter wall 43 and by the collecting volume 425 inside the hollow shank 421 of the lower support plate 42.

The hollow shank 421 comprises one or more radial internal ribs 426 developing along the whole axis.

In the illustrated example there are four internal ribs 426 equally spaced and having a triangular/trapezoidal shape, but they might also be a different number, for example two.

For the purposes of the present invention, the filter cartridge 40 includes at least a conductive strip 50 made of electrically conductive material, which is partially incorporated in the lower support plate 42.

The conductive strip 50 comprises at least an exposed portion 51,52 of the lower support plate 42, for example, the conductive strip 50 exhibits at least a surface which emerges or projects from the lower support plate 42, in which the metal exposed portion 51 is accessible from the inside and/or outside of the lower support plate 42 so as to define an exposed electrical contact.

The at least an exposed portion 51,52 of the conductive strip 50 is destined to come into contact with the at least an electrical contact 33 of the water level sensor 30 when the filter cartridge 40 is correctly inserted in the casing 20, electrically extending the electronic circuit of the water level sensor 30.

The conductor strip 50 includes a first exposed portion 51 that extends internally of the central cavity of the lower support plate 42, for example internally of the cylindrical shank 421 (or the central hole 420).

The first exposed portion 51 therefore includes an end portion of the conductive strip 50 which projectingly branches internally of the central cavity of the lower support plate 42; a portion 53 of the conductive strip 50 is located within the body of the lower support plate 42, sunk therein, for example by co-moulding of the metal conductor strip 50 with the plastic lower support plate 42 or, alternatively, forcibly inserted in a seating formed in the plastic lower support plate.

The first exposed portion 51 is arranged substantially in a radial direction and can exhibit a curved portion (for example downward) so as to axially extend the electrical contact of the electrical circuit of the water level sensor.

In any case, the position of the first exposed portion 51 (the lowest part of it within the casing 20) can define the maximum level reachable by the water in the casing 20 at which the water level sensor 30 is configured to signal a necessary emptying of the filter assembly.

In the example the first exposed portion 51 is arranged internally of the collecting volume 425, i.e. internally of the hollow shank 421, for example in proximity of the upper end 422 thereof.

It is however possible for the first exposed portion 51 to be positioned substantially at the level of the central hole 420 of the lower support plate 42.

In a first variant of the invention there can be the use of a single conductive strip 50 as described above, in a case where the water level sensor 30 exhibits a single electrical contact 33.

The case illustrated in the figures shows a second variant of the invention in which the filter cartridge 40 comprises two conductive strips 50 separated from one another, though they can also be in a number of greater than two if necessary.

The two conductive strips 50, for example, are symmetrical with respect to an axial vertical plane.

The first exposed portions 51 are, for example, arranged diametrically opposite, so as to come into contact, in use, each with a respective electrical contact 33 of the water level sensor (in a case in which they are two in number and also diametrically opposite).

It is advantageously possible for each conductive strip 50 to exhibit a second exposed portion 52, which is located at a distance from the axis of the lower support plate greater than the distance from the axis of the casing 20 (and therefore of the plate of the lower support 42) with respect to the first exposed portion 51.

In this case the portion 53 of the conductive strip 50 incorporated in the lower support plate 42, is an intermediate portion between the first and the second exposed portions 51,52 which places the two exposed portions in electrical connection.

The second exposed portion 52 is for example an end portion of the conductive strip 50.

The second exposed portion 52 is arranged substantially externally of the hollow shank 421 and protrudes radially, by a limited radial amount therefrom.

In the illustrated example, the second exposed portion 52 exhibits an upper surface substantially resting on the lower surface of the lower support plate 42, and is located at the conjoining zone between the lower support plate 42 and the hollow shank 421.

Alternatively, the second exposed portion 52 can have a downwards-curved and axially-projecting portion, for example resting on the outside of the hollow shank 421.

The second exposed portion 52 might be arranged in a more peripheral area of the lower support plate 42 depending on requirements.

In any case, the position of the second exposed portion 52 (the lowest part of it internally of the casing 20) can define the maximum level reached by the water in the casing 20 in which the water level sensor 30 is configured to signal the need to empty the filter assembly 10.

The second exposed portion 52 is, in the example, arranged internally of the first chamber 211 (diesel to be filtered), or externally of the hollow shank 421 and the filter wall 43, for example in proximity of the upper end 422 of the hollow shank 421.

The portion 53 of each conductive strip 50, for example, is sunk in the hollow shank 421, for example with radial longitudinal development.

In the illustrated example the portion 53 is positioned at one of the internal ribs 426.

The other internal ribs 426 not affected by the portion 53 are able to maintain the lower end of the stem 32 of the water level sensor 30 in position.

In this case too, a first variant of the invention might include the use of a single conductive strip 50 as described above (i.e. with two exposed portions 51,52), in a case where the water level sensor 30 exhibits a single electrical contact 33.

The illustrated example shows two conductive strips 50 placed diametrically opposite one another, each provided with a first exposed portion 51, a second exposed portion 52 and an intermediate portion 53, as described above.

Further, in the case where there are two conductive strips 50 (whether they have a single exposed portion 51 or two exposed portions 51,52), they can be electrically insulated from each other and each function as an extension of the electrical contact 33 or in the collecting volume 425 in the first chamber or 211 or in both chambers.

In an advantageous embodiment, illustrated in the figures, the two conductive strips 50 (whether they have only one exposed portion 51 or two exposed portions 51,52) are mutually electrically connected by a resistor 55, which is for example sunk (totally or at least partially) in the lower support plate 42 (e.g. in the hollow shank 421, or in the plate).

In the example the resistor 55 is configured so as to provide an electrical difference that is in fact different to both the electrical resistance of the water and the electrical resistance of the diesel fuel.

The resistor 55, for example, comprises a plate, for example made of metal and semi-annular, arranged coaxially with respect to the lower support plate 42 and having a diameter comprised between the inner diameter and the outer diameter of the lower support plate 42.

The resistor 55 is for example at least partially sunk in the body of the lower support plate 42, for example by co-moulding therewith.

The resistor 55 exhibits the opposite ends thereof respectively in contact with a portion of a conductive strip 50, for example with the portion 53 thereof which is also sunk in the lower support plate 42 (or with the second exposed portion 52).

The connecting cap 26, which could also be protected independently of what is described above, is configured to occlude both the first through-hole 251 of the internal portion 250 of the outlet conduit 25, and a second through-hole 252 made on the bottom of the beaker-shaped body 21, for example in the conjoining area between the internal portion 250 and the bottom of the beaker-shaped body.

In particular, (as shown in the larger-scale details of FIGS. 12 and 13), the bottom of the beaker-shaped body 21 comprises one or more second through-holes 252 made in the respective lowered regions of the bottom, arranged about the internal portion 250 and proximal thereto.

In practice, the first through hole 251 is able to place the collection volume 245 (defined internally of the hollow shank 421 and above the top wall of the internal portion 250) in communication with outside the casing 20; each second through-hole 252 is able to place the first chamber 211 in communication with the external casing 20.

The connecting cap 26 comprises a broadened head 261 from which a threaded stem 262 rises.

The threaded stem 262 can be screwed to the internal thread of the internal portion 250, while the broadened head 261 can be received substantially snugly in a recessed seating of the external wall of the bottom of the beaker-shaped body 21 aligned in plan view with the second through-holes 252.

The threaded stem 262 supports a first end seal 263 (annular or disc-shaped) placed at the free end of the threaded rod and compressible between the top wall of the internal portion 250 and the threaded stem to occlude (substantially sealingly) the first through-hole 251 (from outside the casing 20).

The threaded stem 262 can further comprise a tapered end insertable substantially snugly internally of the first through-hole 251.

The broadened head 261 comprises a second front seal 264 (annular) placed at the base of the threaded rod 262, which is compressible between the bottom wall of the external beaker-shaped body 21 and the upper surface (annular) of the broadened head 261, so as to occlude (substantially sealingly) each second through-hole 252 (from outside the casing 20).

The second front gasket 264 further comprises a radial lip protruding able to ensure the radial seal between the broadened head 261 and the side walls of the recessed seating formed on the bottom of the beaker-shaped body 21.

The broadened head 261 is conformed so as to be able to be screwed and unscrewed from a usual instrumentation.

The connecting cap 26 also comprises at least one water drainage channel 265 defined internally of at least one from between the broadened head 261 and the threaded stem 262.

In practice, the drain 265 exhibits at least an axial portion which flows inferiorly externally of the bottom of the broadened head 261, which is connectable to a usual water drain pipe.

The axial portion of the drainage channel 265 extends along the threaded stem 262 and terminates with one or more radial portions open at the outer skirt of the threaded rod 262, for example through radial openings or axial grooves which are placed at a higher level than the level of the second front seal 264.

In practice, following a partial unscrewing of the connecting cap 26 (see FIG. 13), the drainage channel 265 is able to place the collecting volume 425 in communication with the exterior of the casing 21 by means of, in sequence: the first through hole 251, the radial section and the axial portion of the drainage channel and is also suitable for placing the first chamber 211 in communication with the outside of the casing 21 by means of, in sequence: each second through-hole 252, the radial section and the axial portion of the drainage channel.

Each through-hole 252 is not occluded by the filter cartridge 40, as it is arranged at a respective recessed region of the bottom of the beaker-shaped body 21.

Figure 14:
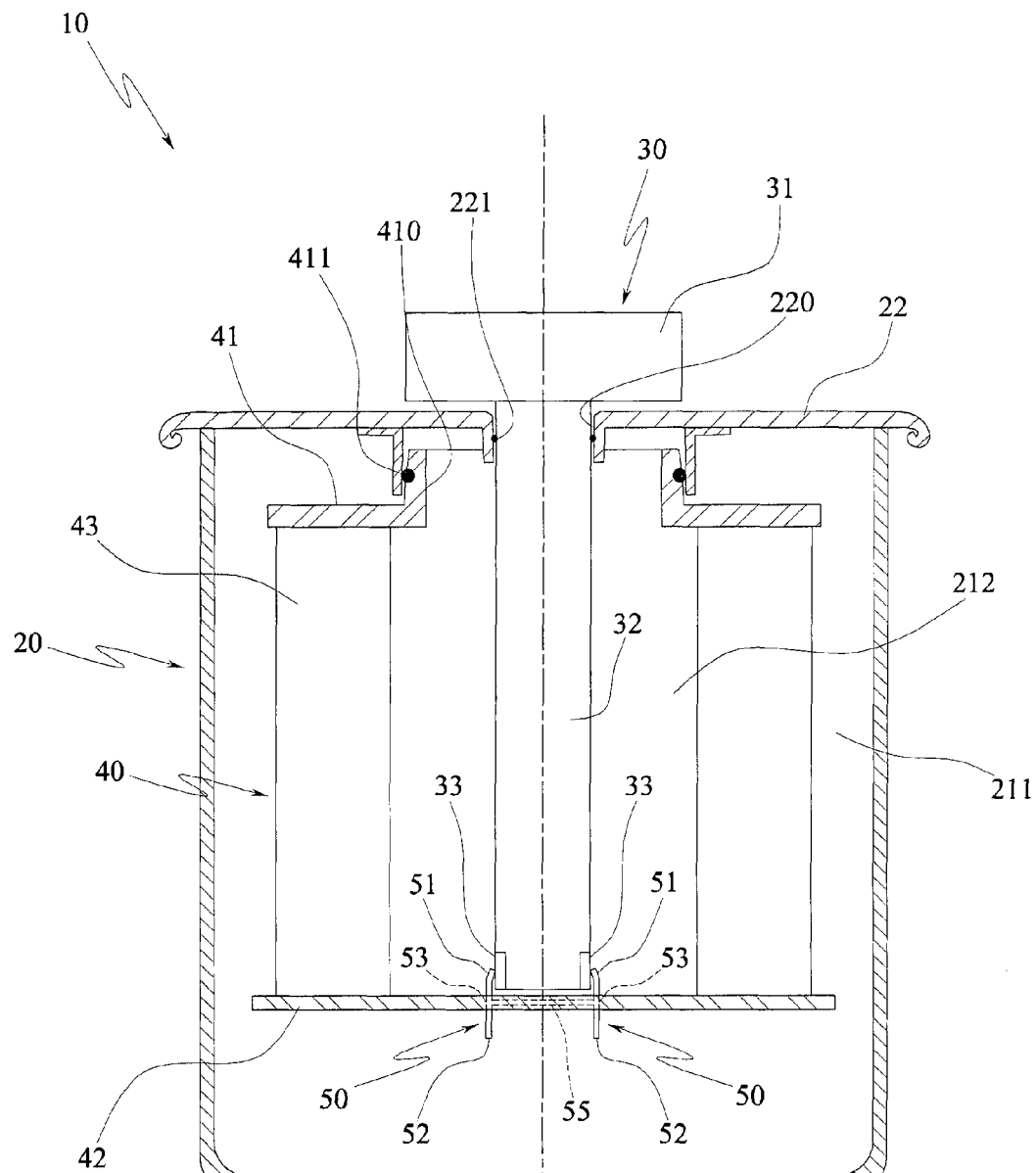
FIG. 14 is a longitudinal section view of a second embodiment of a filter group according to the invention.

FIG. 14 illustrates in its entirety a second embodiment of the filter group 10 for filtering diesel oil in a Diesel engine of a motor vehicle.

The filter group 10 comprises an external casing 20, which in turn comprises, for example, a beaker body 21, and a cover 22 able to close the beaker body 21.

The cover 22 (and/or the beaker body 21) comprises an inlet conduit (not illustrated, as entirely identical to the conduit illustrated for the first embodiment) for the diesel to be filtered and an outlet conduit (also not illustrated for the same reasons as those above) from which the filtered diesel exits.

The beaker body 21 can comprise, for example located at the bottom, a discharge conduit (not illustrated as identical to the conduit illustrated for the first embodiment) for the water which accumulates on the bottom of the beaker body 21, provided with a connecting cap for example as described above. Alternatively, a simple drainage cap screwed to the bottom of the beaker can be included.

Alternatively, a discharge conduit might also be included on the cover 22 and be connected to a cannula sourcing from the bottom of the beaker body 21.

The filter group 10 comprises a water level sensor 30, which for example comprises a plate-shaped head 31 (for example disc-shaped) from which a stem 32 inferiorly projects, which stem 32 internally supports an electronic circuit and at a lower end of bears an exposed electrical contact 33.

In the example, two electrical contacts 33 are shown which, for example, are located diametrically opposite one another.

One electrical contact 33 alone or more than two electrical contacts 33 can be included, according to the functioning of the electronic circuit.

Each electrical contact 33 is realized by a conductive metal plate that can be housed in a flattened part realized in the stem 32.

The water level sensor 30 is configured such as to detect the water level that accumulates on the bottom of the beaker body 21 during the filtration of the diesel and is associated, as known to the technical expert in the sector, to an electronic control board (not illustrated) of the vehicle.

The water level sensor 30 is fixed in the example to the cover 22, for example so that the plate-shaped head 31 is arranged externally of the casing 20 and the stem 32 projects internally of the casing, for example by means of a special through-hole 220 realised in the cover 22, for example with an interposing of a seal ring 221.

In practice, the stem 32 is able to be arranged substantially coaxially to the casing 20.

Further, each electrical contact 33 can be arranged in the casing 20 in proximity of the bottom of the beaker body 21 and at a distance therefrom.

For example, a heating element (such as an electric heater, not illustrated) can be housed internally of the plate-shaped head 31 for heating the diesel contained in the casing 20, for example in the first instants of functioning of the engine.

A filter cartridge, denoted in its entirety by reference numeral 40, is housed internally of the casing 20, which filter cartridge 40 comprises, for example, an upper support plate 41 and a lower support plate 42, which are fixed to opposite ends of a tubular filter wall 43, in the illustrated example a pleated wall, which defines and delimits a substantially-cylindrical internal volume.

The filter wall 43 alternatively might be a depth wall.

The upper support plate 41 is substantially plate-shaped and annular (or disc-shaped with an axial through-hole) and exhibits a central hole 410 (through-hole) centred on the longitudinal axis A of the filter wall 43.

The central hole 410 of the upper support plate 41 can be axially prolonged upwards by a central shank rising from the upper support plate 41.

The central hole 410 of the upper support plate 41 is inserted on a shank projecting internally of the external casing 20 of the cover 22 so that the upper support plate 41 (and the filter cartridge 40) can be axially retained (for example by means of hooks of known type).

In particular, the central hole 410 of the upper support plate 41 inserts on the projecting shank by interposing of a seal ring 411 fixed to the external edge of the central shank, so that the internal volume of the filter cartridge 40 can communicate for example with the inlet conduit opening into the volume comprised internally of the projecting shank.

The lower support plate 42 is also substantially in a closed disc shape, for example without axially-passing holes.

The lower support plate 42 is in particular made of at least an electrically-insulating material, such as for example a plastic material.

Further, the free lower end of the stem 32 projects below the upper support plate 41 and terminates internally of the internal volume of the filter wall 43, for example at a higher level than the lower support plate 42.

The filter cartridge 40 can further comprise a support core (not illustrated) that is hollow and located coaxially and internally of the filter wall 43, which support core is provided with radial openings and is fixed at opposite ends respectively to the upper support plate 41 and the lower support plate 42.

The filter cartridge 40, as occurred in the first embodiment illustrated in FIGS. 1-13, defines an internal volume (located internally of the filter wall 43 and axially delimited by the upper and lower support plates 41, 42) and an opposite external volume.

Owing to the above-described configuration, the filter cartridge 40 sub-divides the internal volume of the casing 20 into a first chamber 211, defined externally of the filter wall 43 and internally of the casing 20, which communicates with the outlet conduit of the diesel to be filtered and into a second chamber 212, coinciding with the internal volume of the filter wall 43, which communicates with the inlet conduit of the diesel to be filtered.

Alternatively the first chamber 211 can communicate with the inlet conduit of the diesel to be filtered and the second chamber 212 communicates with the outlet conduit of the filtered diesel according to constructional needs.

The filter cartridge 40 can further comprise a hydrophobic net (not illustrated), for example also tubular, coaxially inserted in the filter wall 43, in such a way as to intercept the flow of fuel which crosses the filter wall.

The lower support plate 42 might include draining holes, for example located axially aligned with a toroidal region of interspace comprised (internally) between the filter wall 43 and the hydrophobic net (for example tubular and coaxially inserted internally of the filter wall 43 and supported at opposite ends thereof by the upper support plate 41 and the lower support plate 42).

In this configuration of the filter cartridge 40 the hydrophobic net can sub-divide the internal volume of the filter wall 43 into two environments of which one of the environments is in communication with the bottom of the beaker body 21 via the drainage holes, in which the water accumulates on separation from the diesel (by means of the hydrophobic net).

Alternatively or additionally, the filter wall 43 is of a coalescent type in such a way as to improve the separation of the water from the diesel.

The filter group 10 can comprise orientating means of the filter cartridge 40, able to orientate the filter cartridge 40 internally of the casing 20.

The orientating means can be entirely alike to those described for the first embodiment described above and the description is not repeated here for the sake of brevity.

In practice, thanks to the orientating means, only a limited number of orientations of the filter cartridge 40 are allowed (for example two) internally of the casing 20.

For the aims of the present invention, the filter cartridge 40 comprises at least a conductive strip 50 made of an electrically-conductive material, which is partially sunk in the lower support plate 42.

The conductive strip 50 comprises at least an exposed portion 51, 52 from the lower support plate 42, for example the conductive strip exhibits at least a surface emerging or projecting from the lower support plate 42, in which the exposed metal portion 51 is accessible from inside and/or from outside the lower support plate 42 such as to define an exposed electrical contact.

The at least an exposed portion 51, 52 of the conductive strip 50 can come into contact with the at least an electrical contact 33 of the water level sensor 30 when the filter cartridge 40 is correctly inserted in the casing 20, electrically prolonging the electronic circuit of the water level sensor 30.

The conductive strip 50 comprises a first exposed portion 51 which axially projects internally of the internal volume of the filter cartridge 40.

In practice, the first exposed portion 51 is located at a higher level than the lower support plate 42.

The first exposed portion 51 further comprises an end portion of the conductive strip 50 which branches projectingly above the lower support plate 42 internally of the internal volume of the filter cartridge 40 (i.e. internally of the second chamber 212 into which the internal volume of the casing 20 is sub-divided by the filter cartridge 40).

A further portion 53 of the conductive strip 50 is located internally of the body of the lower support plate 42 and sunk therein, for example by means of co-moulding of the metal conductive strip 50 with the plastic lower support plate 42 or, alternatively, by forced insertion in a seating realized in the plastic lower support plate 42.

The first exposed portion 51 is arranged with the longitudinal axis arranged substantially in an axial direction (in such a way as to axially prolong the electrical contact of the electrical circuit of the water level sensor) in an offset position with respect to the lower support plate 42 and can exhibit a curved portion (for example towards the central axis of the lower support plate 42). The first exposed portion 51 (in particular the free end or a zone proximal thereto) can come into contact (for example forced) with the at least an electrical contact 33 of the water level sensor 30 when the filter cartridge 40 is correctly inserted in the casing 20, in such a way that the conductive strip 50 can electrically prolong (in an axial direction) the electronic circuit of the water level sensor 30.

A first variant embodiment of the invention might include use of a single conductive strip 50 as described in the foregoing, in a case in which the water level sensor 30 exhibits a single electrical contract 33.

In the illustrated embodiment in the figure, a second variant of the invention is shown, in which the filter cartridge 40 comprises two conductive strips 50, separated from one another, but can also be in a number of more than two if required.

The two conductive strips 50 for example are symmetrical with respect to an axial vertical plane.

The first exposed portions are, for example, arranged diametrically opposite, so as to come into contact, in use, each with a respective electrical contact 33 of the water level sensor (in a case in which the water level sensors are also two in number and diametrically opposite).

It is advantageously possible for each conductive strip 50 exhibits a second exposed portion, which is located at a lower level with respect to the first exposed portion 51 and in particular at a lower level the (or the same level as) the lower axial end of the lower support plate 42.

In this case the portion 53 of the conductive strip 50, sunk into the lower support plate 42, is an intermediate portion (with a substantially axial development) between the first and the second exposed portion 51, 52 which place the two exposed portions in electrical connection.

The second exposed portion 52, for example, comprises or is an end portion of the conductive strip 50.

The second exposed portion 52 projects axially, for a limited axial tract, below the lower support plate 42, so as to be contained in the volume external of the filter cartridge 40, i.e. in the first chamber 211 into which the internal volume of the external casing 20 is sub-divided by the filter cartridge 40.

In the illustrated example, the second exposed portion 52 exhibits a longitudinal axis substantially axially arranged (and offset) and projects inferiorly of the lower support plate 42.

In any case, the position of the second exposed portion 52 (of the lowest part thereof internally of the casing 20) can define the maximum level reachable by the water in the casing 20 to which the water level sensor 30 is configured so as to signal the necessary emptying of the filter group 10.

The second exposed portion 52 is, in the example, arranged internally of the first chamber 211 (of the filtered diesel).

In practice, as happened for the first embodiment illustrated in FIGS. 1-13, the first exposed portion 51 is located internally of the internal volume delimited by the filter cartridge 40 and the second exposed portion 52 is located externally of the internal volume thereof (i.e. in the external volume of the filter cartridge 40).

Further, in a case in which two conductive strips 50 are present (whether they have one portion only exposed 51 or two portions exposed 51, 52), the strips can be electrically insulated from one another and each function as extensions of the electrical contact 33 in the first chamber 211 (or in any case below the lower support plate 42).

In an advantageous embodiment variant, shown in the figures, the two conductive strips 50 (whether they have a single exposed portion 51 or two exposed portions 51, 52) are electrically connected to one another by a resistor 55, which is for example sunk (totally or at least partially) in the lower support plate 42.

In the example the resistor 55 is configured so as to provide a different electrical difference both from the electrical resistance of the water and from the electrical resistance of the diesel.

The resistor 55, for example, comprises a plate-shaped element or a filament, for example made of metal, for example semi-annular or straight or of a different shape which electrically connects the two conductive strips 50.

The resistor 55 is for example at least partly (or totally) sunk into the body of the lower support plate 42, for example by co-moulding therewith.

The resistor 55 exhibits the opposite ends respectively in contact with a portion of a conductive strip 50, for example with the further portion 53 thereof also sunk into the lower support plate 42 (or with the first or second exposed position 51, 52 according to requirements).

In the light of the above, the operation of the filter group 10 (according to the first embodiment illustrated in FIGS. 1-13) is as follows.

To make the filter group 10 operative, the connecting cap 26 is used to occlude firstly the first and the second through-holes 251, 252.

Then the filter cartridge 40 is inserted axially into the beaker-shaped body 21 in such a way that the hollow shank 421 inserts on the internal portion 250 of the discharge conduit 25.

It then proceeds, closing the cover 22 on the beaker-shaped body 21.

The cover 22 is rotated with respect to the longitudinal axis A of the filter cartridge 40 until the ribs 220 insert in the positioning grooves 412.

Once the positioning grooves 412 are engaged by the ribs 220, the correct mutual positioning between the filter cartridge 40 and the cover 22 is ensured, so as to ensure direct contact between an exposed portion (the first exposed portion 51) of one or both the conductive strips 50 and a respective electrical contact 33 of the water level sensor 30.

The functioning of the water level sensor 30 is different depending on the level sensor used and/or the configuration thereof.

The following contains a description of some operating methods of the water level sensor 30 in combination with the filter cartridge 40 in the filter group 10.

If the water level sensor 30 exhibits a single electrical contact 33 and the filter cartridge 40 a single conductive strip 50 the operation of the water level sensor 30 is as follows.

The water level sensor 30 always comprises a pair of electrical contacts, of which only one, the electrical contact 33, is immersed in the fluid under filtration and the other is grounded.

Since water has a higher electrical conductivity than diesel oil, if the conductive strip 50 is fully immersed in the diesel, once the electronic circuit is powered-up, the strip 50 measures a first value of current intensity at the heads of the electrical contacts, dependent on the electrical resistance of the diesel fuel.

If the water that accumulates on the bottom of the housing 20 reaches a level such as to intercept, even only partially, an exposed portion 51,52 of the conductive strip 50, the electronic circuit measures, at the heads of the electrical contracts, a second intensity value of the current, dependent on the electrical resistance of the water and, therefore, greater than the first value of current intensity, and signals correspondingly to the control unit the need to proceed to the emptying of the water through the discharge conduit 25.

This happens both in the case in which the conductive strip 50 comprises a single exposed portion 51 and when it comprises the first exposed portion 51 and the second exposed portion 52, which are accessible independently of the level of the water present in the respective environment into which the bottom of the casing 20 is sub-divided.

If the water level sensor 30 has two electrical contacts 33, as in the illustrated case, and the filter cartridge 40 comprises two respective conductive strips 50, the operation of the water level sensor 30 could be the following.

Both the electrical contacts 33 are immersed in the fluid under filtration, as are also the conductive strips 50.

Since water has a higher electrical conductivity than diesel, if both of the conductive strips 50 are immersed in the diesel oil, the electronic circuit, when powered-up, measures a first value of current intensity at the heads of the electrical contacts 33 that depends on the electrical resistance of the diesel.

If the water accumulating on the bottom of the housing 20 reaches a level such as to contact, even only partially, an exposed portion 51,52 of the conductive strips 50, the electronic circuit measures a second current intensity value at the heads of the electrical contacts 33, dependent on the electrical resistance of the water and, therefore, greater than the first current intensity value, and signals correspondingly to the control unit the need to proceed to the evacuation of the water through the discharge conduit 25.

In this case too, this happens both in the case in which the conductive strips 50 comprise a single exposed portion 51 and when they comprise the first exposed portion 51 and the second exposed portion 52, which are accessible independently of the level of the water present in the respective environments into which the bottom of the housing 20 is sub-divided.

Lastly, in a case where the filter cartridge 40 also includes the resistor 55, it places the two conductive strips 50 in connection via an electrical resistance that is different from both the electrical resistance of the water and the electrical resistance of the diesel (for example greater than the electrical resistance of the water).

Therefore, in, a case where the casing is empty (or full of diesel oil), the electronic circuit once powered-up measures a reference value of the current intensity at the heads of the electrical contacts 33, dependent on the electrical resistance of the resistor 55 (or also of the diesel).

The electronic circuit and the control unit are configured such as to generate an alarm signal if the intensity value detected is different from the reference value, as this might be a sign for example that the filter cartridge 40 inserted is not the one originally intended for the determined filter group or is positioned incorrectly in the casing.

In any case, if both of the conductive strips 50 are immersed in the diesel, the electronic circuit when powered-up measures a first value of current intensity at the heads of the electrical contacts 33, dependent on the electrical resistance of the diesel and the resistor 55.

If the water that accumulates on the bottom of the housing 20 reaches a level such as to involve, even only partially, an exposed portion 51,52 of the conductive strips 50, the electronic circuit measures a second intensity value current at the heads of the electrical contacts 33, dependent on the electrical resistance of the water and, therefore, greater than the first value of current intensity, and signals correspondingly to the control unit the need to proceed to the evacuation of the water through the discharge conduit 25.

In the light of the above description, the functioning of the filter group 10 (according to the second embodiment shown in FIG. 14) is the following.

Once the correct reciprocal position between the filter cartridge 40 and the cover 22 has been ensured, so as to guarantee direct contact between an exposed position (the first exposed portion 51) of one or both the conductive strips 50 and a relative electrical contact 33 of the water level sensor 30, the filter group 10 is correctly installed.

The functioning of the water level sensor 30 is different according to the level sensor used and/or the configuration thereof.

Should the water level sensor 30 exhibit a single electrical contact 33 and the filter cartridge 40 a single conductive strip 50, the functioning of the water level sensor 30 might be the following.

The water level sensor 30 still comprises a pair of electrical contacts, of which one only, the electrical contact 33, is immersed in the fluid being filtered and the other is earthed.

As water has a greater conductivity than diesel, if the conductive strip 50 is completely immersed in the diesel, once the electric circuit is activated, the circuit measures a first intensity value of the current at the heads of the electrical contacts, which first intensity depends on the electrical resistance of the diesel.

If the water accumulating on the bottom of the casing 20 reaches a level such as to intercept, even only partially, an exposed portion 51,52 of the conductive strip (in particular the second exposed portion 52 located at a lower level internally of the external casing 20), the electronic circuit measures, at the heads of the electrical contacts, a second current intensity value, depending on the electrical resistance of the water and, therefore, greater than the first current intensity value, and signals correspondingly to the electronic control board the need to proceed to the evacuating of the water via the discharge conduit.

If the water level sensor 30 exhibits two electrical contacts 33, as in the illustrated case, and the filter cartridge 40 comprises two respective conductive strips 50, the functioning of the water level sensor 30 might be the following.

Both the electrical contacts 33 are immersed in the fluid being filtered, as are the conductive strips 50.

As the water has a greater conductivity than the diesel, if both the conductive strips 50 are immersed in the diesel, once the electronic circuit is powered-up it measures, at the heads of the electrical contacts 33, a first current intensity value, depending on the electrical resistance of the diesel.

If the water accumulating on the bottom of the casing 20 reaches a level so as to involve, even partially, an exposed portion 51, 52 of the conductive strips 50 (in particular the second exposed position 52 located at a lower level internally of the casing 20), the electronic circuit measures, at the heads of the electrical contacts 33, a second current intensity, depending on the electrical resistance of the water and therefore greater than the first current intensity value, and correspondingly signals to the electronic control board the need to proceed to the emptying of the water through the discharge conduit.

Lastly, in a case in which the filter cartridge 40 also comprises the resistor 55, it places the two conductive strips in communication via a different electrical resistance from both the electrical resistance of the water and the electrical resistance of the diesel (for example greater than the electrical resistance of the water).

Therefore, in a case in which the casing is empty (or in any case full of diesel), once the electronic circuit is powered up, it measures, at the heads of the electrical contacts 33, a reference value of the current intensity, depending on the electrical resistance of the resistor 55 (or also the diesel).

The electronic circuit and the control board are configured in such a way as to generate an alarm signal if the intensity value detected is different to the reference value, which is for example an indication that the filter cartridge 40 fitted is not the original cartridge intended for the determined filter group or is positioned wrongly in the casing.

In any case, if both the conductive strips 50 are immersed in the diesel, once the electronic circuit is powered-up it measures a first current intensity value at the heads of the electrical contacts 33, depending on the electrical resistance of the diesel and the resistor 55.

If the water that accumulates on the bottom of the casing 20 reaches a level such as to involve, even only partially, an exposed portion 51, 52 of the conductive strips 50 (in particular the second exposed portion 52 located at a lower level than the inside of the external casing 20), the electronic circuit measures, at the heads of the electrical contacts 33, a second current intensity value, depending on the electrical resistance of the water and, therefore, greater than the first current intensity value, and correspondingly signals to the control board the need to proceed to the evacuation of the water via the discharge conduit.

The invention thus conceived is susceptible to numerous modifications and variations, all within the inventive concept.

Moreover, all the details are replaceable by other technically equivalent elements.

In practice, the materials employed, as well as the contingent shapes and dimensions, may be any according to requirements without thereby abandoning the scope of protection of the following claims.

The invention claimed is:

1. A filter cartridge (40), for filtering a fluid, comprising a central axis a tubular filter wall (43) and at least an annular support plate (42) fixed to a lower end of the filter wall (43) and made of at least an electrically-insulated material, wherein the filter cartridge (40) comprises at least a conductive strip (50) made of an electrically conductive material, partially sunk in the support plate (42) and provided with at least a portion (51, 52) exposed therefrom, wherein the conductive strip (50) comprises a first exposed portion (51) and a second exposed portion (52) and at least an intermediate portion (53) of the conductive strip (50) that is intermediate between the first and the second exposed portions (51, 52) and is sunk in the support plate (42), wherein the first exposed portion (51) is located at a greater axial height with respect to the second exposed portion (52).

2. The filter cartridge (40) of claim 1, wherein the cartridge (40) comprises at least a pair of the conductive strips (50).

3. The cartridge of claim 2, wherein the conductive strips (50) of the pair of conductive strips (50) are electrically insulated from one another.

4. The cartridge (40) of claim 2, wherein the conductive strips (50) of the pair of conductive strips (50) are electrically connected to one another by means of at least a resistor (55) at least partially sunk into the support plate (42).

5. The cartridge (40) of claim 1, wherein the first exposed portion (51) is located at a distance from an axis of the support plate (42) that is smaller with respect to the distance from an axis of the support plate (42) of the second exposed portion (52).

6. The cartridge (40) of claim 1, wherein the intermediate portion (53) includes a longitudinal axis substantially arranged in a radial direction sunk into the support plate (42).

7. The cartridge (40) of claim 1, wherein the first exposed portion (51) extends radially with respect to the filter wall and is located at a higher level than the lower support plate (42), and the second exposed portion (52) is located at a lower level than or a same level as a lower axial end of the lower support plate (42).

8. The cartridge (40) of claim 1, wherein the conductive strip (50) exhibits at least the intermediate portion(53) having a longitudinal axis substantially arranged in an axial direction sunk in the support plate (42).

9. A filter group (10) comprising an external casing (20) provided with at least an inlet (23) of the fluid to be filtered, at least an outlet (24) of the filtered fluid, and a filter cartridge (40), according claim 1, contained internally of the casing (20), such that the filter wall (43) is crossed by the fluid flowing from the inlet (23) towards the outlet (24) and the support plate (42) of the filter cartridge (40) is a lower plate proximal to a bottom of the casing (20), at least an electrical contact (33) of a sensor of water in diesel (30) arranged in proximity of the bottom of the casing (20) and associated thereto, wherein the at least an exposed portion (51) of the conductive strip (50) is able to come into contact with the at least an electrical contact (33), when the filter cartridge (40) is contained internally of the casing (20) so as to extend the electrical contact (33).

10. A filter cartridge (40), for filtering a fluid, comprising a central axis a tubular filter wall (43) and at least an annular support plate (42) fixed to a lower end of the filter wall (43) and made of at least an electrically-insulated material, wherein the filter cartridge (40) comprises at least a conductive strip (50) made of an electrically conductive material, partially sunk in the support plate (42) and provided with at least a portion (51, 52) exposed therefrom, wherein the conductive strip (50) comprises a first exposed portion (51) and a second exposed portion (52) and at least an intermediate portion (53) of the conductive strip (50) that is intermediate between the first and the second exposed portions (51, 52) and is sunk in the support plate (42), wherein the support plate (42) comprises at least a hollow shank (421) coaxial with the filter wall (43) and communicating with an internal volume of the filter wall (43) by means of a central hole (420) of the support plate (42), a first exposed portion (51) of the conductive strip (50) being located internally of the hollow shank (421) and a second exposed portion (52) being located externally of the hollow shank (421).

11. The cartridge (40) of claim 10, further comprising an annular seal (424) associated to the hollow shank (421).

12. A filter group (10) comprising an external casing (20) provided with at least an inlet (23) of the fluid to be filtered, at least an outlet (24) of the filtered fluid, and a filter cartridge (40), according claim 10, contained internally of the casing (20), such that the filter wall (43) is crossed by the fluid flowing from the inlet (23) towards the outlet (24) and the support plate (42) of the filter cartridge (40) is a lower plate proximal to a bottom of the casing (20), at least an electrical contact (33) of a sensor of water in diesel (30) arranged in proximity of the bottom of the casing (20) and associated thereto, wherein the at least an exposed portion (51) of the conductive strip (50) is able to come into contact with the at least an electrical contact (33), when the filter cartridge (40) is contained internally of the casing (20) so as to extend the electrical contact (33).

\* \* \* \* \*